United States Patent [19]

Stratton

[11] 4,067,581
[45] Jan. 10, 1978

[54] STEPPER FOR SLOW MOTION DISC RECORDER

[75] Inventor: Boyd Lehman Stratton, Woodside, Calif.

[73] Assignee: Arvin Industries, Inc., Columbus, Ind.

[21] Appl. No.: 738,674

[22] Filed: Nov. 4, 1976

[51] Int. Cl.² ................................................ G11B 3/10
[52] U.S. Cl. ................................................ 274/23 A
[58] Field of Search ........................... 274/23 A, 23 R; 360/107, 10

[56] References Cited

FOREIGN PATENT DOCUMENTS 2,212,733  9/1973  Germany ........................... 274/23 A Primary Examiner—Harry N. Haroian
Attorney, Agent, or Firm—Biebel, French & Nauman

[57] ABSTRACT

A disc recorder has a rotating recording disc and a transducer assembly, including a transducer, which cooperates with the disc. A carriage is provided for mounting the transducer assembly. An idler pulley and a drive pulley, one of the pulleys being inward from the periphery of the disc and the other pulley being positioned outward of the disc from the first pulley cooperate with a carriage belt arrangement which is attached to the carriage and to the drive pulley and which extends around the idler pulley. The carriage belt arrangement includes first and second carriage belts which are each attached at one end to the carriage and at their other ends to the drive pulley. Additionally a third carriage belt is attached to the carriage and extends in the opposite direction from the first and second belts and is attached to the drive pulley intermediate the first and second carriage belts.

4 Claims, 6 Drawing Figures

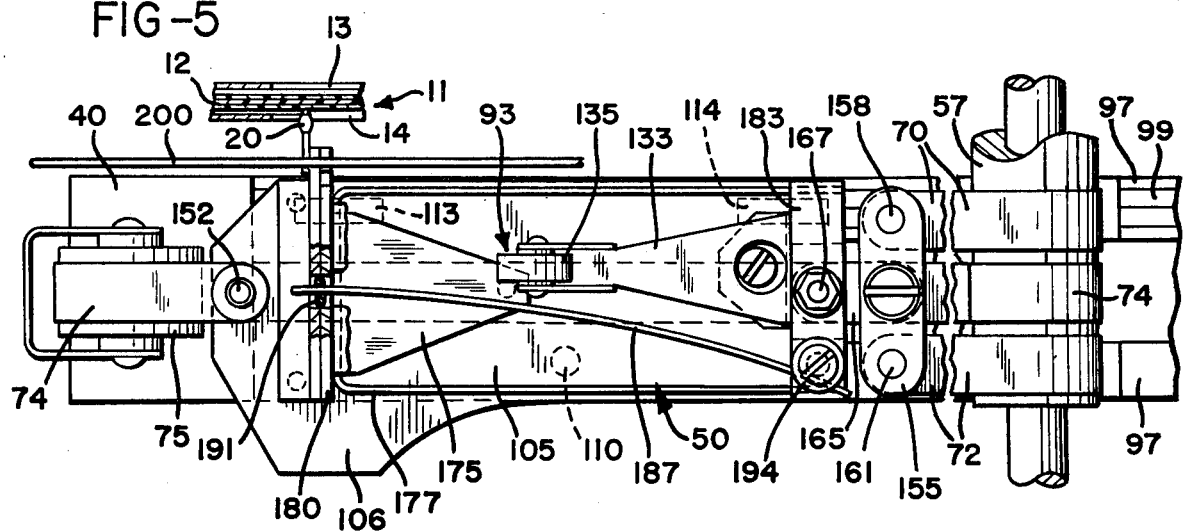
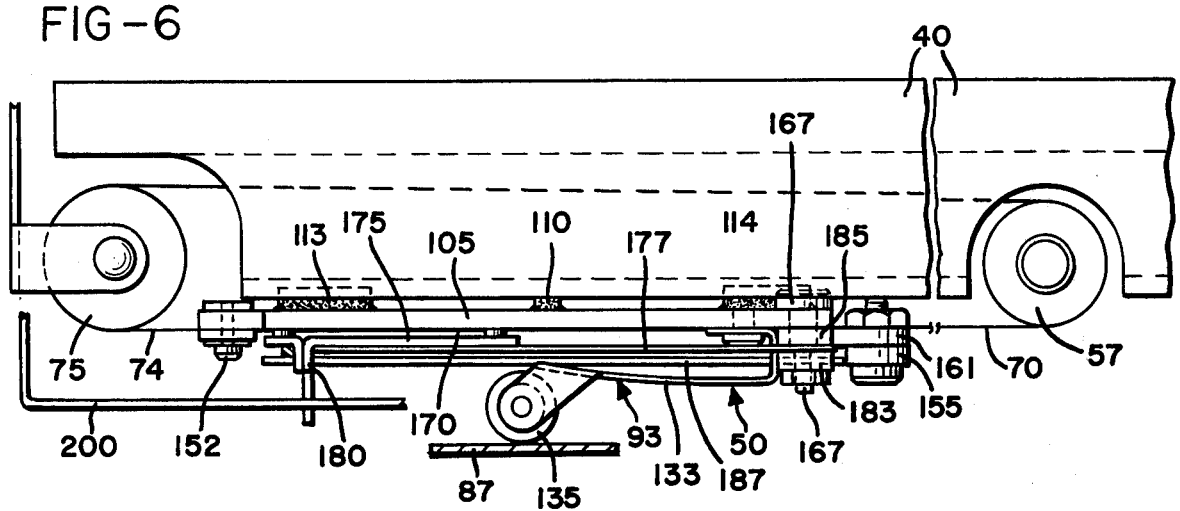

STEPPER FOR SLOW MOTION DISC RECORDER

BACKGROUND OF THE INVENTION

The present invention relates to disc recorders and more specifically to recorders in which video information is recorded on a rapidly rotating magnetic disc. The disc used in such a recorder may be constructed of either rigid or flexible material. The recording disc is rapidly rotated and one or more transducer heads are positioned adjacent the recording surface to record and reproduce the video information. If desired, transducers may be provided for recording and playback on both sides of the recording disc.

Recording of video signals on a disc recorder may be accomplished in a number of ways. In one format, the video signal is stored in a number of circular concentric recording tracks and the transducer is moved only intermittently to the desired track for recording or playback. Generally one field of video information will be stored in each of the tracks. The disc will be rotated, therefore, at a rate equivalent to the field rate of the video signal.

A second recording format for disc recorders is shown in U.S. Pat. No. 3,509,274, to Kihara, issued on Apr. 28, 1970. The transducer head is moved radially during disc rotation such that a continuous spiral track is defined. While such a recording format permits a slower transport mechanism to be utilized, this format is disadvantageous in that continuous high quality reproduction of a single video field, or series of fields, is not easily obtained.

Regardless of the format used, however, it is clear that a controlled, dimensionally precise transport must be provided for each transducer. One type of prior art transducer transport is shown in U.S. Pat. No. 3,770,905 to Sperry, issued Nov. 6, 1973, and U.S. Pat. No. 3,814,441 to Craggs, issued June 4, 1974. These patents show transport mechanisms in which a radially disposed, threaded rod engages the transducer carriage and is rotated by a stepping motor to move the transducer radially with respect to the disc. Since the carriage mechanism and the threaded rod it engages are both moving, the inertia of the transport is significant and a rapid stepping motion is difficult to obtain.

A second type of prior art transducer transport mechanism is shown in U.S. Pat. No. 3,539,716, issued Nov. 10, 1970, to Stratton et al. In this type of transport mechanism, a transducer carriage is moved radially by means of a carriage belt. The belt forms a loop around an idler pulley which is adjacent the center of the recording disc. Both ends of the belt are positively attached to the drive pulley, with each end being wrapped around the drive pulley a number of times. Positive engagement of the belt by the drive pulley is required since a frictional drive arrangement would always be subject to slippage and the resulting misalignment of the transducer with respect to the recording tracks. Since it is necessary to attach positively both ends of the drive belt to the drive pulley, with each end being wrapped around the drive pulley a number of times, the belt ends must be attached to the drive pulley at different levels. As shown in the Stratton et al patent, the idler pulley must therefore be skewed with respect to the drive pulley to compensate for the fact that the drive belt must change levels as it extends around the idler pulley. An arrangement of this type is somewhat disadvantageous in that there will always be a certain amount of friction between the drive belt and the idler pulley. Additionally, each section of the drive belt extending from the idler pulley to the drive pulley will be twisted along its length and will exert in undesirable torque on the transducer carriage.

SUMMARY OF THE INVENTION

A disc recorder having a rotating recording disc includes a carriage means for mounting a transducer assembly and a transducer cooperable with the disc. An idler pulley and a drive pulley are positioned such that one of the pulleys is inward of the periphery of the disc and the other pulley is outward from the axis of rotation. The carriage means is moved by a carriage belt means attached to the drive pulley and extending around the idler pulley. The portion of the carriage belt means attached to the carriage means is supported along a path which extends parallel to the disc. A stepping motor is provided to rotate the drive pulley such that the transducer is moved radially with respect to the rotating disc. The carriage belt means includes first and second belts, each attached to the carriage means and to the drive pulley, and a third carriage belt attached to the carriage means, extending in the opposite direction from the first and second belts, and attached to the drive pulley intermediate the first and second belts. A linkage arrangement is used to attach the first and second carriage belts to the carriage means such that the force applied to the carriage means by the third belt is counterbalanced.

Accordingly, it is an object of the present invention to provide a transducer transport mechanism in which a drive pulley and an idler pulley have parallel axes of rotation; to provide such a transport mechanism in which friction and binding of the carriage belts is substantially reduced; and, to provide such a transport mechanism in which twisting forces on said carriage are substantially eliminated.

Other objects and advantages of the present invention will be apparent from the following description, the accompanying drawings, and the appended claims.

BRIEF DESCRIPTION OF THE DRAWINGS

FIG. 5 is an enlarged front view showing the details of the transducer transport mechanism; and FIG. 6 is a plan view of the portion of the device shown in FIG. 5.

DETAILED DESCRIPTION OF THE INVENTION

Figure 1:
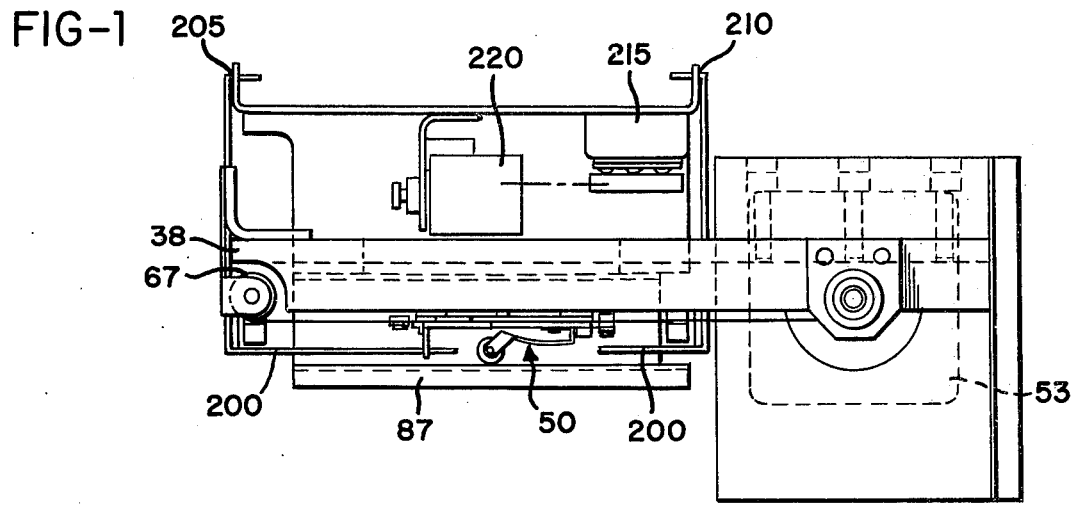
FIG. 1 is a plan view of a recorder embodying the present invention with portions of the device removed.
Figure 2:
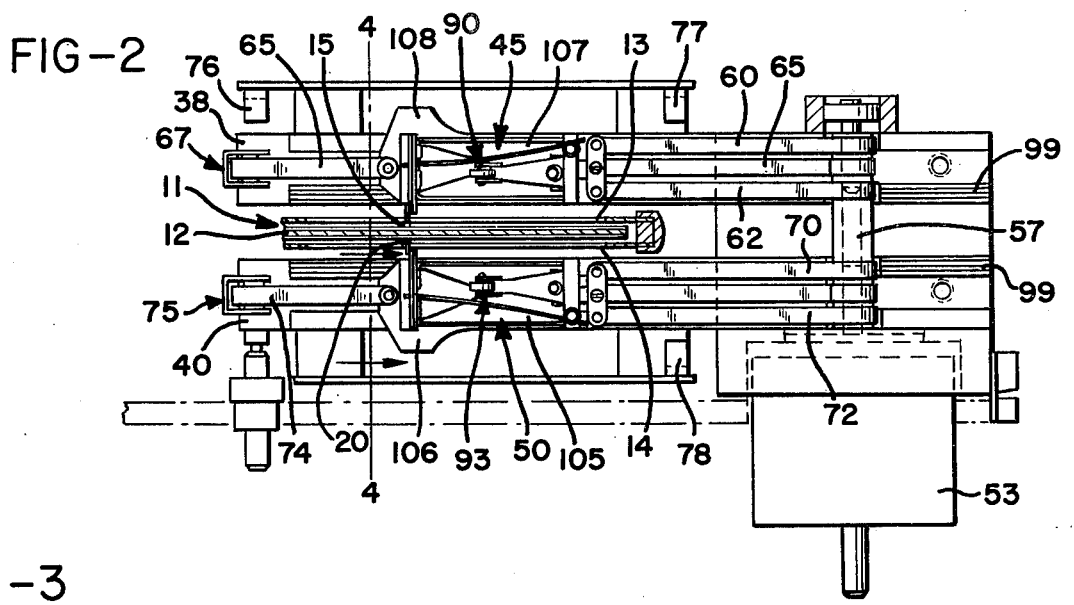
FIG. 2 is a front view of the recorder of FIG. 1.
Figure 3:
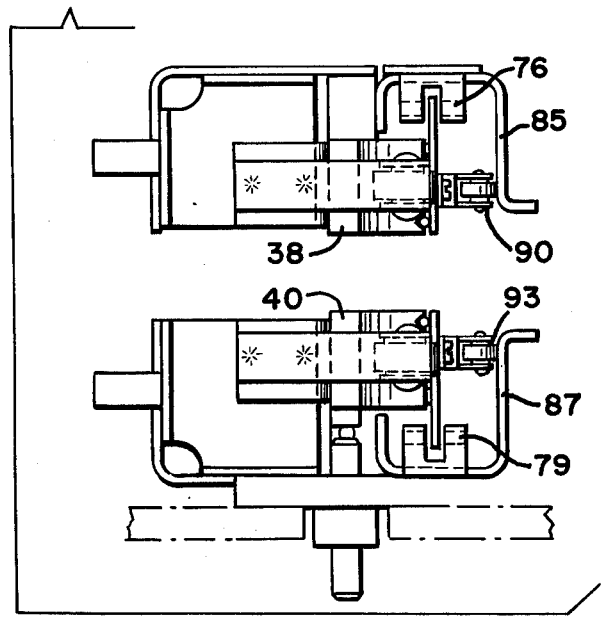
FIG. 3 is a side view of a portion of the recorder as seen looking left to right in FIG. 2.

Referring now to FIGS. 1, 2 and 3, there is shown a portion of a disc recorder embodying the present invention. FIG. 1 is a plan view with portions of the device removed and broken away. FIG. 2 is a front view of the recorder with the disc cartridge in section. FIG. 3 is a view looking left to right in FIG. 2 with the transducer assemblies and the disc cartridge removed. While disc recorders for recording video signals may use either rigid magnetic discs or flexible disc, those recorders using flexible discs offer greater versatility while reducing the possibility of damage to the disc during operation of the recorder. As seen in FIG. 2, a cartridge 11 may be provided in which the flexible magnetic recording disc 12 is housed. Radially extending slots 13 and 14 in each side of the disc cartridge 11 permit access to the disc by transducers 15 and 20.

The record disc 12 extends between a pair of guide members 38 and 40, one above and one below the disc as shown in FIG. 2. The transducer assemblies 45 and 50 are moved along guide members 38 and 40, respectively, by stepping motor 53. A common drive pulley 57 is used to move both transducer assemblies with the result that they are stepped simultaneously to corresponding positions on opposite sides of the disc. Carriage belt means, including a first carriage belt 60, second carriage belt 62, and third carriage belt 65 move transducer assembly 45 when drive pulley 57 is rotated. Idler pulley 67 at the opposite end of the guide member 38 positions belt 65 as assembly 45 is moved. In like manner, belts 70, 72 and 74 and idler pulley 75 move transducer assembly 50 along guide member 40.

The extent of travel of transducer assemblies 45 and 50 is limited by photo sensors 76, 77, 78 and 79. Sensor 78 is used as a reset to detect when the transducers have been moved to an initial position. The sensors 76, 77 and 79 are provided to protect against overtravel and are not actuated during normal recorder operation.

Running parallel to guide members 38 and 40 are locating members 85 and 87 (FIGS. 1 and 3). Loading means 90 and 93, mounted on transducer assemblies 45 and 50, interact with locating members 85 and 87 to assure the positional stability of the transducer assemblies, as is more fully explained below. The transports for the upper and lower transducers 19 and 20 are identical.

Figure 4:
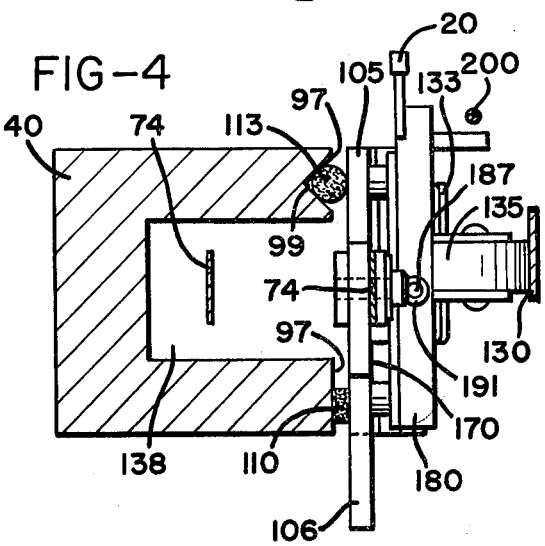
FIG. 4 is an enlarged sectional view taken generally along line 4—4 in FIG. 2.

Each of the guide members 38 and 40 is generally U-shaped in cross section, as seen in FIG. 4 and provides a guide surface 97 extending transversely of the disc 35 and including a groove 99 extending parallel to the disc. FIG. 4, an enlarged sectional view of guide member 40, shows transducer carriage means 105 having tab 106 which interacts with the photosensors as explained above. Carriage means 107 likewise includes tab 108 for actuating the appropriate photosensors.

Friction reducing bearing pad 110 is attached to carriage means 105 and slides along guide surface 97. A pair of cylindrical bearing means 113 and 114 are mounted on the carriage member 105 in spaced relation to bearing pad 110 and are positioned to be slidable in groove 99. Loading means 93 includes leaf spring 133 and roller 135 which engage locating surface 130 and bias carriage means 105 toward guide surface 97. Groove 99 and bearing means 113 and 114 prevent relative vertical motion between carriage means 105 and guide member 40 as the transducer assembly is moved along the guide member.

Referring now to FIGS. 5 and 6, the details of the transducer transport mechanism are shown. Guide member 40 extends between drive pulley 57 and idler pulley 75. Carriage means 105 includes friction reducing cylindrical bearing means 113 and 114 and a bearing pad 110. The bearing means and bearing pad allow the carriage means 105 to slide along guide member 40 on guide surface 97. As shown in FIG. 4, groove 99 engages the cylindrical bearing pads on the carriage means as a result of the interaction between loading means 93 and locating surface 130.

The carriage means 105 is moved along guide member 40 such that the transducer head 20 moves radially with respect to flexible recording disc 12. First and second carriage belts 70 and 72 are each attached at one end to carriage means 105 and at the other end to drive pulley 57. Belts 70 and 72 will typically be pinned to drive pulley 57 and will be wrapped around the pulley a number of times. Also pinned to pulley 57 and wrapped around it is third carriage belt 74. Belt 74 is attached to carriage means 105 and extends in the opposite direction from the first and second belts 70 and 72. It should be noted that the third belt 74 is attached to drive pulley 57 intermediate second belts 70 and 72. As seen in FIG. 4, belt 74 extends from idler pulley 75 to drive pulley 57 through cavity 138.

Belt 74 is pivotally attached by bolt 152 to carriage means 105. On the opposite side of the carriage means, a "T"-shaped linkage arrangement is connected to belts 70 and 72. A first linkage means 155 is pivotally attached to belts 70 and 72 at pivot points 158 and 161. A second linkage means 165, attached to the first linkage means 155 intermediate the first and second carriage belts 70 and 72, is pivotally secured to carriage means 105 by bolt 167. The opposing forces applied to the carriage means 105 by the first, second, and third belts are therefore aligned. Second linkage means 165 is secured to carriage means 105 by bolt 167. Since the axes of the drive and idler pulleys are parallel, the friction between the belts and the pulleys is reduced and transducer movement may therefore be effectuated very rapidly. Additionally, since the carriage belts are not twisted, there is not twisting moment applied to the carriage means.

Transducer carriage 105 includes a mounting surface 170 which is substantially perpendicular to rotating disc 12 and substantially parallel to the direction of movement of carriage 105. A transducer holding plate 175 is positioned adjacent and parallel to mounting surface 170. Parallel motion linkage means 177 includes a generally U-shaped wire which attaches the transducer holding plate 175 to carriage 105. The parallel motion linkage means confines the motion of the transducer holding plate 175 in a plane parallel to the mounting surface 170 to motion which is substantially perpendicular to rotating disc 12. Parallel linkage means 177 is attached to holding plate 175 by potting the wire along the side of flange 180. The ends of the wire are rigidly secured between bar 183 and backing blocks 185. It should be understood that two separate parallel wires could be used as the parallel linkage means with the first ends of the wires attached to the mounting surface 170 and the other ends attached to holding plate 175.

Spring means, including wire spring arm 187, biases the transducer holding plate 175 against mounting surface 170 and also biases plate 175 toward rotating disc 12. Transducer means 20 is rigidly attached to holding plate 175 and thus moves toward disc 12 with a biasing force determined by spring 187. Spring 187 extends through a bearing in the form of a glass bead 191 set in flange 180. The other end of spring 187 is adjustably secured by mounting 194 to bar 183. Glass bead 191 prevents twisting forces from being applied to holding plate 175 by spring 187.

The transducer assembly of the present invention is particularly useful where rapid transducer movement is required due to its low inertial mass. Additionally, the force exerted on the recording disc by the transducer head may be easily and precisely adjusted.

Bale 200 is provided adjacent the upper edge of flange 180 and extends along the length of travel of transducer 20. A similar bale is provided for transducer assembly 45. As seen in FIG. 1 these bales extend to pivots 205 and 210 and are linked to rotary solenoid 215 and dashpot 220. When solenoid 215 is actuated, the bales contact the transducer holding plates and move heads 15 and 20 away from flexible disc 12. The motion of the recording heads is sufficient to allow disc 12 and cartridge 11 to be withdrawn from the recorder.

While the forms of apparatus herein described constitute preferred embodiments of the invention, it is to be understood that the invention is not limited to these precise forms of apparatus, and that changes may be made therein without departing from the scope of the invention.

What is claimed is:

1. In a disc recorder having a rotating recording disc; a transducer assembly including a transducer cooperable with said disc; carriage means for mounting said transducer assembly; an idler pulley and a drive pulley, one of said pulleys being inward from the periphery of said disc and the other pulley being positioned outward of said disc from said one pulley; carriage belt means attached to said carriage means and to said drive pulley and extending around said idler pulley, the portion of said belt means attached to said carriage means being supported along a path extending parallel to said disc; and stepping motor means connected to rotate said drive pulley such that said transducer is moved radially of said rotating disc; the improvement in which said carriage belt means comprises:

first and second carriage belts each attached at one end to said carriage means and attached at their other end to said drive pulley and,
   a third carriage belt attached to said carriage means, extending in the opposite direction from said first and second belts, and attached to said drive pulley intermediate said first and second carriage belts, whereby the axis of rotation of said idler pulley is parallel to the axis of rotation of said drive pulley and said carriage belt means is operable with reduced binding and friction.

2. In a rotating disc recorder, a transport mechanism for moving a transducer radially along the surface of the rotating disc comprising:

carriage means for mounting a transducer assembly including a transducer,
   an idler pulley and a drive pulley, one of said pulleys positioned inward of the periphery of the rotating disc, and the other of said pulleys positioned outward therefrom,
   first and second carriage belts attached to said carriage means and to said drive pulley
   a third carriage belt attached to said carriage means and to said drive pulley intermediate said first and second carriage belts, said third carriage belt extending around said idler pulley, and
   means for rotating said drive pulley such that said carriage is movable in a path parallel to said disc and said transducer is movable radially along the surface of the rotating disc, whereby binding of the transport mechanism of twisting of the belts are minimized.

3. The transport mechanism of claim 2 in which said carriage means comprises:

means for pivotally attaching said third carriage belt to said carriage means,
   first linkage means attached to said first and second carriage belts, and
   second linkage means, attached to said first linkage means intermediate said first and secnd carriage belts, for pivotally securing said first and second carriage belts to said carriage means such that the opposing forces applied to said carriage means by said first and second carriage belts and by said third carriage belts, respectively, are aligned.

4. The transport mechanism of claim 2 in which said drive pulley is positioned outwardly of said idler pulley.

* * * * *